(12) United States Patent
Chen

(10) Patent No.: US 8,643,847 B1
(45) Date of Patent: Feb. 4, 2014

(54) INTERFEROMETRIC TECHNIQUE FOR MEASURING PATTERNED SAPPHIRE SUBSTRATES

(75) Inventor: Dong Chen, Tucson, AZ (US)

(73) Assignee: Bruker Nano Inc., Santa Barbara, CA (US)

( * ) Notice: Subject to any disclaimer, the term of this patent is extended or adjusted under 35 U.S.C. 154(b) by 460 days.

(21) Appl. No.: 13/103,087

(22) Filed: May 8, 2011

(51) Int. Cl.
  *G01B 11/02* (2006.01)
(52) U.S. Cl.
  USPC .......................................... 356/511; 356/516
(58) Field of Classification Search
  USPC ........................... 356/511, 516, 489, 495, 514
  See application file for complete search history.

(56) References Cited

U.S. PATENT DOCUMENTS

| | | | | |
|---|---|---|---|---|
| 6,028,670 A | * | 2/2000 | Deck | 356/497 |
| 6,989,905 B2 | * | 1/2006 | De Groot | 356/516 |
| 7,605,925 B1 | * | 10/2009 | Chen | 356/511 |

* cited by examiner

*Primary Examiner* — Tarifur Chowdhury
*Assistant Examiner* — Jonathan Hansen
(74) *Attorney, Agent, or Firm* — Antonio R. Durando

(57) ABSTRACT

A patterned sapphire substrate is measured from a fine phase map and a coarser height map of the sample. The boundaries of the PSS features are identified by finding the locations of minimum contrast in the modulation map of the substrate and are used to produce a height map of the substrate base and a phase map of center regions of the features. A fringe-order map of the features with respect to the base is used to identify the most prevalent fringe order of pixels in the center-regions of the features. That fringe order is adopted as the correct offset between corresponding pixels in the phase map of the center regions of the features and the base of the substrate. A complete map of the substrate is thus obtained by combining the phase map of the features with the height map of the substrate with an offset equal to the fringe order produced by the invention.

43 Claims, 24 Drawing Sheets

INTERFEROMETRIC TECHNIQUE FOR MEASURING PATTERNED SAPPHIRE SUBSTRATES

BACKGROUND OF THE INVENTION

1. Field of the Invention

This invention relates in general to vertical-scanning interferometry (VSI) for surface characterization. In particular, it relates to a statistical approach applied to determine the fringe order of phase data for measuring uniform micro-features in a sample, such as in patterned sapphire substrates (PSSs) of light emitting diodes (LEDs).

2. Description of the Related Art

The high-brightness LED (HB-LED) industry is experiencing rapid growth as a result of demand for applications in televisions and computer displays, automotive lighting, mobile-phone and other hand-held device displays, and as a more efficient solution for general residential and commercial lighting. Each of these applications requires end products that exhibit tightly controlled efficiency and color, with center wavelength variation of no more than 4 nanometers, so as to be undetectable by the human eye. Optical interferometric profilometry is a proven method for measuring and monitoring HB-LED wafer surfaces rapidly and repeatably in three-dimensional (3D) detail, thereby enabling an increase in production efficiency and quality.

The structure of a typical LED includes gallium nitride (GaN) n-p layers interlaced with multi-quantum well (MQW) layers grown epitaxially on a sapphire substrate S, as shown in FIG. 1(a). A transparent protective layer of conductive indium tin oxide (ITO) completes the LED structure. Usually, only a relatively small percentage of the total light emitted by the LED can be extracted due to the large difference in the index of refraction between the GaN (and the other LED materials) and air. This difference produces total internal reflection at the device-air interface and light is therefore reflected back and lost into the device. In order to enhance the efficiency of light extraction, several methods are currently used in the art, including random surface texturing, flip-chip technology, photonic crystals, and patterned sapphire substrates.

PSS structures, illustrated in FIG. 1(b), have a surface patterned with uniform, dome-like, features D that protrude from the flat base B of the surface. These 3-D features have several advantages over the other approaches for improving LED performance and are, therefore, widely used in commercial HB-LED devices. Only standard semiconductor photo-lithographic processes are required to create PSS structures, which reduces the cost of implementation. Also, in addition to enhancing light extraction efficiency, PSS structures reduce dislocation defect density, both of which contribute significantly to overall device efficiency. Thus, manufacturers utilize a variety of PSS structure shapes to enhance LED performance and light extraction.

The exact shape of PSS structures varies from manufacturer to manufacturer, with typical patterns including pyramidal, conical, or hemispherical shapes. Each individual protrusion is typically several micrometers in width and between 1 and 2 micrometers in height, with an overall pattern pitch between 2 and 5 micrometers. The shape is optimized during the development phase of the structure, while in production manufacturers work to control the width, height and pitch at a high sampling rate for process control. The height of the PSS structures is particularly crucial because deviations from the target value affects efficiency and wavelength uniformity, and can even cause electrical shorts if the features penetrate the active layer. Also, because the deposition process is very slow, maintaining height uniformity is very important for production throughput.

Scanning electron microscopes (SEMs) are normally used to image PSS structures during the research and development phase of a product and to visualize the fine details of the sidewall shape. Atomic force microscopes (AFMs) are popular as well, both for research and for process control, because they allow non-destructive sample handling and high-resolution imaging. Where sampling rates are such that throughput is not a factor, these technologies provide true 3D quantification of features, including sub-nanometer vertical resolution and very high slope capability. However, LED manufacturers process hundreds to thousands of PSS substrates daily and their throughput requires fast, accurate, and non-destructive 3D surface metrology, which is not compatible with either SEM or AFM utilization.

For rapid feedback on production-line applications, white-light interferometry (WLI) is quickly becoming the technology of choice. White light interferometry (an optical interferometric profilometry technique) has been employed with great success in high-volume production environments for more than two decades, providing 3D surface maps with nanometer-level accuracy and repeatability. As is well understood in the art, a light beam from a broadband light source is split into two by a beam splitter, with one beam directed to a high-quality reference surface and the other to the sample surface. After reflection from their respective surfaces, these two beams are recombined at an optical detector, usually a CCD camera, and the difference in the length of the paths followed by each beam produces a sinusoidal interference signal when the difference in the path lengths of the two beams is near zero. As the objective scans through focus in the vertical direction, each point on the measured surface passes through this equal-path location and the signal has maximum contrast. The vertical scan location of the maximum contrast point corresponds to the surface height for each pixel in the image, thereby producing an accurate 3D map of the surface.

The accuracy of WLI has been improved over the years by combining phase-shifting interferometry (PSI) techniques with conventional white-light vertical scanning. Such approaches have enabled measurements of steep or discontinuous surfaces without $2\pi$ ambiguity and with PSI resolution. For example, U.S. Pat. No. 7,605,925, hereby incorporated by reference in its entirety, describes performing a broadband interferometric vertical scan of a sample surface to produce interference data and a corresponding coarse surface profile in real time using a conventional technique, such as a center-of-mass calculation. A fine surface map is obtained concurrently using a quadrature-demodulation algorithm applied in real time to the same interference data used for the coarse surface calculation. The fine surface map is then combined with the coarse surface profile using an unwrapping technique that produces a final surface map with sub-nanometer resolution within a large height range. This technique has been referred to as high definition vertical scan interferometry (HDVSI).

However, in practice scanner steps are not exactly constant and cannot be determined precisely by calibration. To improve this shortcoming, U.S. Pat. No. 7,898,672, hereby also incorporated by reference in its entirety, teaches an error correction procedure for scanner position wherein the filter parameters of the quadrature demodulation module of the HDVSI algorithm are adjusted using a reference signal from an independent position measurement device (PMD). As illustrated in the diagram of FIG. 2, the step size generated by the PMD at each scanner step is substituted for the nominal scanner step in the quadrature demodulation algorithm calculating phase and in the coherent envelope algorithm calculating peak. This substitution eliminates all errors produced by scanner nonlinearities. Furthermore, over the large number of steps carried out during a normal scanning range, random scanner-position errors (such as produced by vibration and other system noise) are automatically corrected by integration over their normal distribution around the noise-free position value. Therefore, a complete correction of scanner-position error is achieved using the reference signal.

However, as one skilled in the art will readily appreciate, the width and especially the height measurements of the typical PSS feature, as well as similar structures in other surfaces, present a particularly difficult challenge because of the very steep walls in the transition zone from the base of the sapphire substrate to the patterned feature. In such zone the broadband light is largely scattered, yielding very little contrast for meaningful white-light interferometry, with a signal that often is indistinguishable from background and other noise. For example, FIG. 3 illustrates in cross-section the results of a conventional VSI measurement of a patterned sapphire structure with dome-like features about 3.50 nm wide and 1.54 nm high (based on AFM measurements). It is difficult to determine the width of the feature by identifying the location where the base is projected upward (and vice versa on the other side of the feature). The approximately true profile of the dome features is illustrated by the phantom lines D and the true base line of the sapphire structure by the solid line B. The VSI line illustrates the "batwing" artifacts produced both at the top of each dome (because of the change in slope) and in the transition zones (because of the steep slope) by conventional vertical scanning. It is clear that the measurement does not produce a precise estimate of width and height. The main problem with the data near the peaks of the domes lies in the fact that the phase data utilized to generate the map are often subject to fringe-order errors that appear randomly in pixel-by-pixel analysis.

A not much better result is achieved using the HDVSI technique of FIG. 2. As seen in FIG. 4, this improved procedure still produces batwing artifacts and fringe errors (i.e., errors resulting from $2\pi$ ambiguity) that make it impossible to calculate precise dimensions for the patterned features on the sapphire substrate. The same problem of random fringe-order error produces batwings in the pixel-by-pixel procedure used to generate PSS height maps. Therefore, in order to enable fast and reliable measurements of such features in PSSs and similar structures for quality control in a production environment, there is still a need for an improved technique. The present invention describes an optical profilometric solution based on the general idea of combining the best available height data for the substrate with phase data for the relatively smooth area around the tops of the features using a statistical approach to determine the correct fringe order of the phase data. The invention is illustrated with data produced by the HDVSI algorithm of FIG. 2 with sample features having the structure of PSSs, but it is understood that the invention is more broad in its scope and that it can be applied to interferometric data obtained by any measurement technique, so long as a good phase map is available for the tops of the features and a reliable height map for the entire surface of the substrate is available for producing a fringe-order map. Such maps could be obtained, for example, by measuring the substrate with dual-wavelength interferometry, or by a combination of VSI and PSI measurements.

BRIEF SUMMARY OF THE INVENTION

The invention is based on the notion that substrates with bumps (or dimples) can typically be measured with a high degree of precision at the base and near the peaks of each feature because of the relatively mild slopes present in those areas, but not so in the areas of transition. Therefore, rather than aiming at producing a continuous profile with improved methodology, as done in the past, the invention utilizes the best available data acquired by some means for the substrate and for the areas around the peaks, which are normally the areas of interest for geometric characterization of the features, and it calculates an offset based on the most likely fringe order of phase data for regions near the peaks of the features (which will normally also be near the center of the feature).

According to one aspect of the invention, the location of each feature in the substrate is determined in some manner and the corresponding location of each peak is determined geometrically based on a-priori knowledge of the feature geometry. For example, if the feature is dome-shaped with a circular cross-section, the peak is assumed to be at the center of the circle defined by the cross-section. Based on this information about the location of the features, height and phase maps of the top regions of the features are extracted from corresponding height and phase maps of the substrate. This can be accomplished advantageously using at least one mask delineating the top regions of the features for which smooth phase data are available.

In general, very accurate data are available from phase measurements of the tops of the features, but their precise location with respect to the base of the substrate is not known exactly because of the discontinuity associated with phase measurements between the base and the tops of the features. However, a coarser continuous measurement can be obtained by conventional white-light vertical-scanning interferometry, from which a fringe-order map can be obtained simply, for example, by dividing the WLI height at each pixel by half the wavelength used for the PSI measurement of the features and rounding to the closest integer.

According to another aspect of the invention, a fringe order map of the feature regions is obtained from the height map. Inasmuch as the height profile of a surface is often obtained by adding phase data to a corresponding fringe-order map, in such cases the fringe-order map is readily available for the invention simply by subtracting the phase data from the corresponding height map produced thereby. The fringe-order map is then analyzed to determine the fringe order that is most likely to be correct for the top-region data isolated with the mask. For example, the simple assumption that the fringe order common to the largest number of pixels within the top regions is most likely to be correct proved to produce reliable results. On that basis, that fringe order is adopted as the offset between the base of the substrate and the pixels from which it was derived. Then the phase data for the selected top areas of the features, which are known to be highly reliable based on the smooth character of their surface, are adjusted to reflect the offset so calculated according to the invention, thereby producing an improved map of the feature top surfaces.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

BRIEF DESCRIPTION OF THE DRAWINGS

FIG. 1(b) is a schematic sectional illustration of a typical LED with a patterned sapphire structure.

DETAILED DESCRIPTION OF THE INVENTION

Those skilled in the art recognize the direct and precise correlation between phase and height with regard to interferometric measurements. Therefore, phase and height, as well as phase data and height data, and also phase map and height map, are used interchangeably in the description that follows without regard to the details of calculation. All operations, such as the subtraction of one map from another, are intended to be performed on the same basis even though not particularly so pointed out in the disclosure. Similarly, the description refers to figures depicting phase maps, but it is understood that such images are only visual representations of phase maps, the actual phase values being represented by gray-scale contrast in the figures, darker regions corresponding to smaller phase values. The terms "patterned feature," "feature," "bump" and "protrusion" are used interchangeably in this description to refer to each of the three dimensional structures formed on an otherwise flat substrate surface, such as the dome-like bumps formed on patterned sapphire substrates. The term "feature" is also intended to encompass a "dimple," i.e., the negative of a bump.

Figure 1:
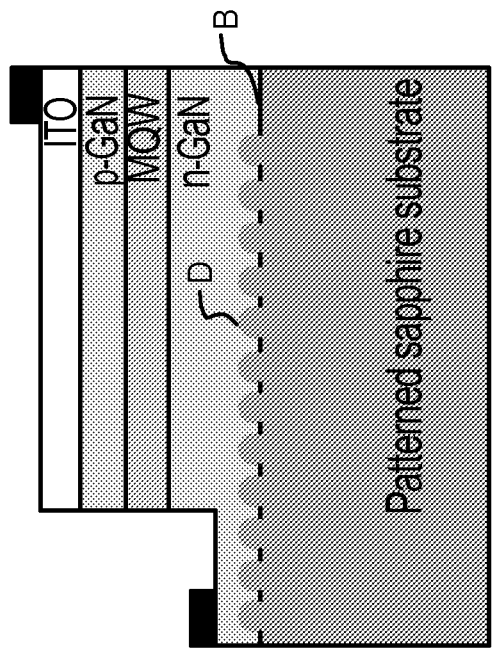
FIG. 1(*a*) is a schematic sectional illustration of a typical conventional LED structure.
Figure 2:
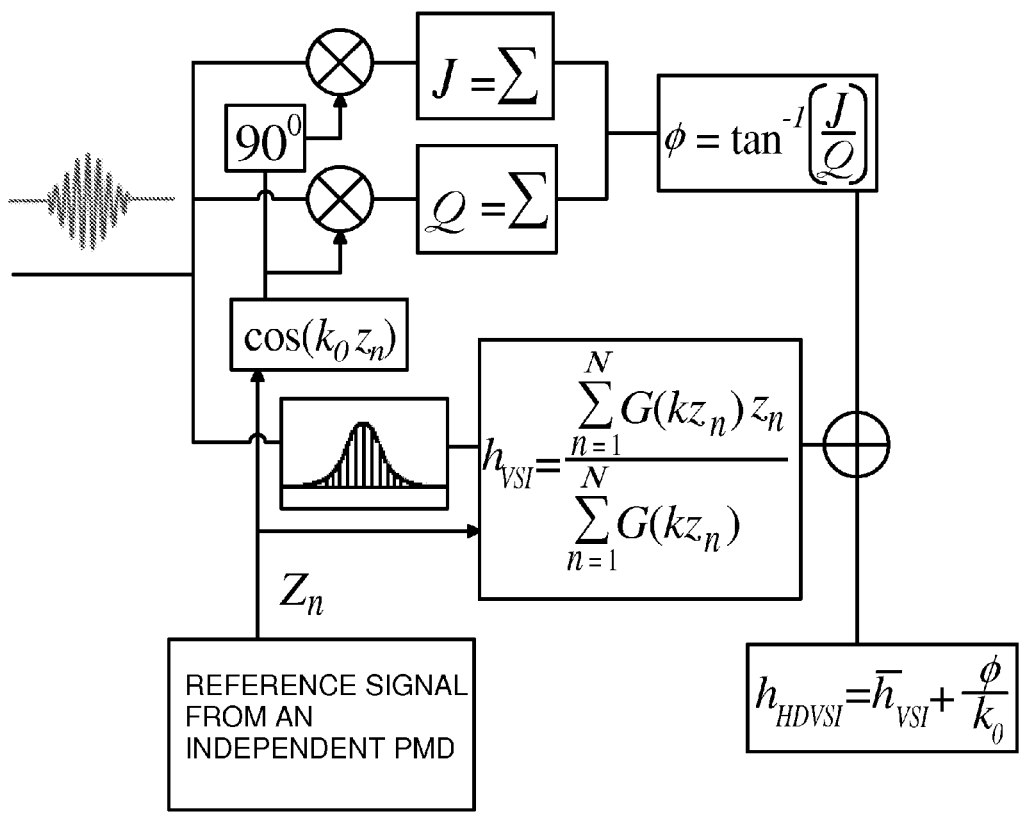
FIG. 2 is a diagram representing the HDVSI quadrature-demodulation algorithm wherein a reference signal is used to correct the phase step non-linearities of the scanner.

As mentioned, the improved HDVSI procedure disclosed in U.S. Pat. No. 7,898,672, outlined schematically in FIG. 2, provides a useful vehicle for illustrating the invention. In HDVSI, the fringe phase and the peak of the coherent envelope of the correlogram are calculated independently and in parallel. The fringe phase is calculated using a quadrature demodulation technique wherein the scanner step size is a parameter. In order to correct for scanner non-linearity, U.S. Pat. No. 7,898,672 teaches replacing the nominal phase step of the scanner with the actual phase step produced by an independent position measurement device in a quadrature demodulation algorithm, as illustrated in the figure. For the purposes of HDVSI measurements, this step is preferred but optional.

The HDVSI procedure taught in U.S. Pat. No. 7,605,925 and in U.S. Pat. No. 7,898,672 produce, among other data, a modulation map, a phase map, and a high-definition vertical-scan interferometry (HDVSI) map of the PSS substrate. Using the modulation map, a map of regions containing PSS features in the substrate can be obtained by finding locations where the modulation is below a predetermined empirical threshold, thereby determining the boundary, the diameter and the center of each feature (assuming the features are dome-shaped with a circular cross-section. Note that PSS features are typically round and symmetric with a peak at the center of the feature; therefore, the base region can correspondingly be defined by the locations where modulation is above the chosen threshold. The center of the area corresponding to each feature can then be determined by application of simple geometric principles.

Figure 3:
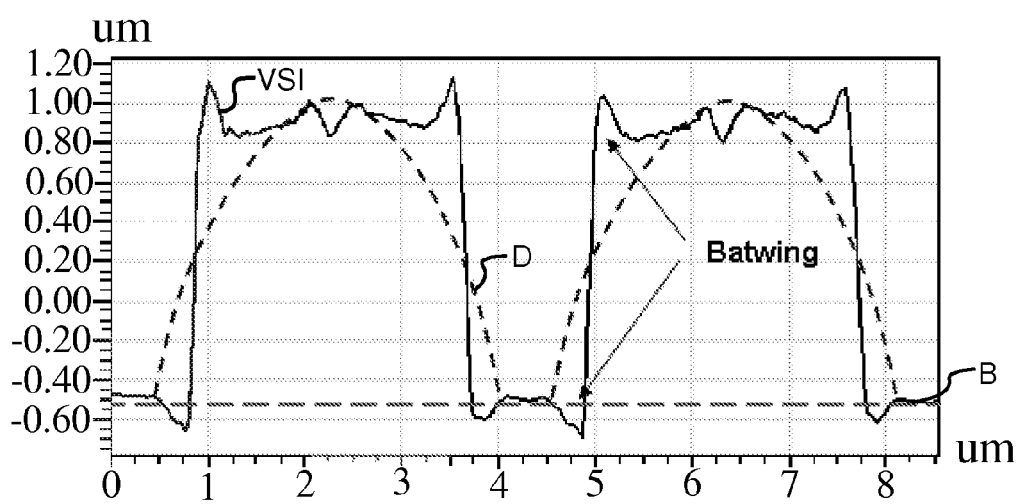
FIG. 3 is a cross-sectional profile of a PSS structure obtained with conventional VSI measurements.
Figure 4:
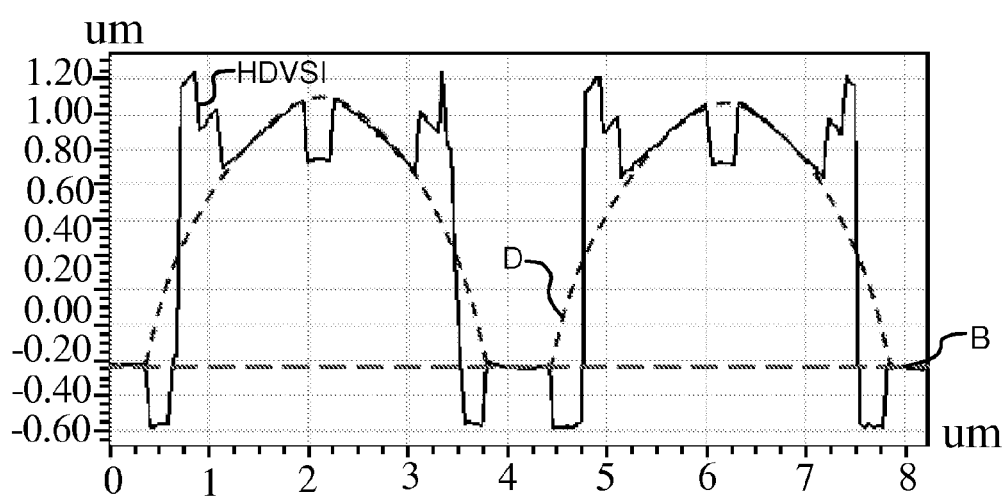
FIG. 4 is a cross-sectional profile of a PSS structure obtained with the HDVSI procedure.

In the implementation of the invention that utilizes HDVSI data, the map of regions containing the PSS features is then preferably used to produce two masks, one representing feature regions around the center of each feature where the heights measured by HDVSI are most likely to be free of the batwing artifacts (illustrated in FIGS. 3 and 4) and the other representing regions, often larger, for which reliable phase data are available. To that end, the masks are produced using two values of feature diameter that reflect these respective criteria, noting that the same value may be used for convenience when appropriate in view of the particular data at hand. One mask, of smaller diameter for the purpose of illustration, is combined with both the phase map and the HDVSI map of the whole substrate to extract a phase map and an HDVSI map of the center regions of the features, respectively. The other, supposedly larger-diameter, mask is combined with the phase map of the substrate to extract a phase map of the feature regions.

The phase map of the center regions is then subtracted from the HDVSI map of the center regions of the features to yield a fringe-order map for the center regions. The fringe-order map of the center regions is analyzed according to the invention, such as with a number-of-pixels-per-fringe-order histogram, to determine the most prevalent fringe order in the map. That fringe order is then adopted as the correct fringe order and as the correct offset between the base of the substrate and the phase data of the center regions of the features.

An HDVSI map of the flat substrate base is also produced simply by subtracting the map of the PSS features from the HDVSI map of the substrate. A corrected map of the entire substrate is then obtained by combining the HDVSI map of the flat substrate base with the phase map of the features using the offset derived from the fringe-order map according to the invention. The resulting map shows features with tops that exhibit PSI-measurement precision and peaks positioned at the corrected height. The flat base of the substrate exhibits HDVSI-measurement precision. The procedure of the invention does not yield improved data for the transition zones between the flat substrate and the 3-D features. However, the profiles for these zones can be added easily by conventional interpolation based on the known shape of the features. In any event, these data are not important for the measurement of feature width and height, the thrust of the procedure.

Figure 5:
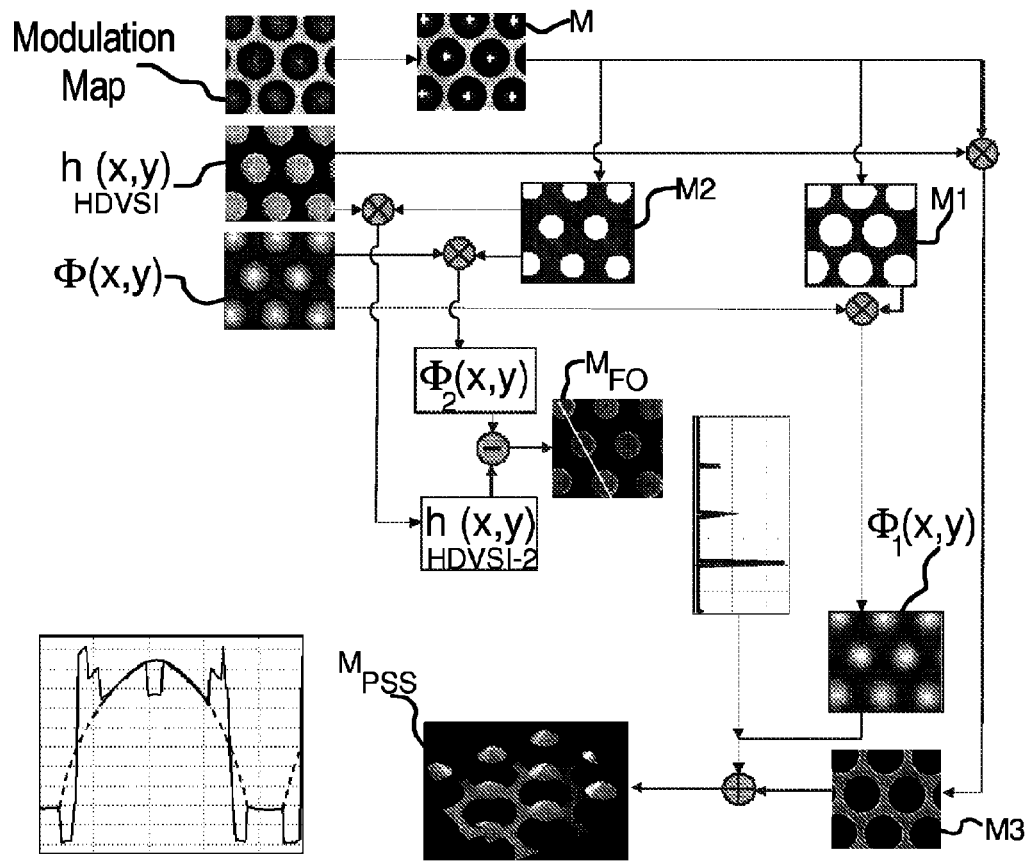
FIG. 5 is a flow-chart of the procedure of the present invention with map and mask images to illustrate the various steps followed to calculate the width and height of the features of a PSS structure.

Referring now to the figures for a more detailed illustration of the procedure of the invention, the HDVSI procedure of U.S. Pat. No. 7,605,925, with or without the correction for scanner non-linearity described in U.S. Pat. No. 7,898,672, produces three sets of suitable data, as illustrated in FIG. 5. One is the modulation map produced by vertical scanning interferometric measurements of the sample surface, herein referred to as such. The second one is the high definition phase map, $\Phi(x, y)$ [or equivalently a corresponding height map $h_{HD}(x, y)$] obtained by the quadrature demodulation step of the HDVSI procedure, referred to herein as the phase map. The third set of data is the final height map produced by the HDVSI procedure, $h_{HDVSI}(x, y)$, herein referred to as the HDVSI map. Each of these maps, as produced by the HDVSI procedure, is used in a novel manner pursuant to the invention for determining the average width and height of PSS features reliably and rapidly for effective quality control purposes.

Figure 6:
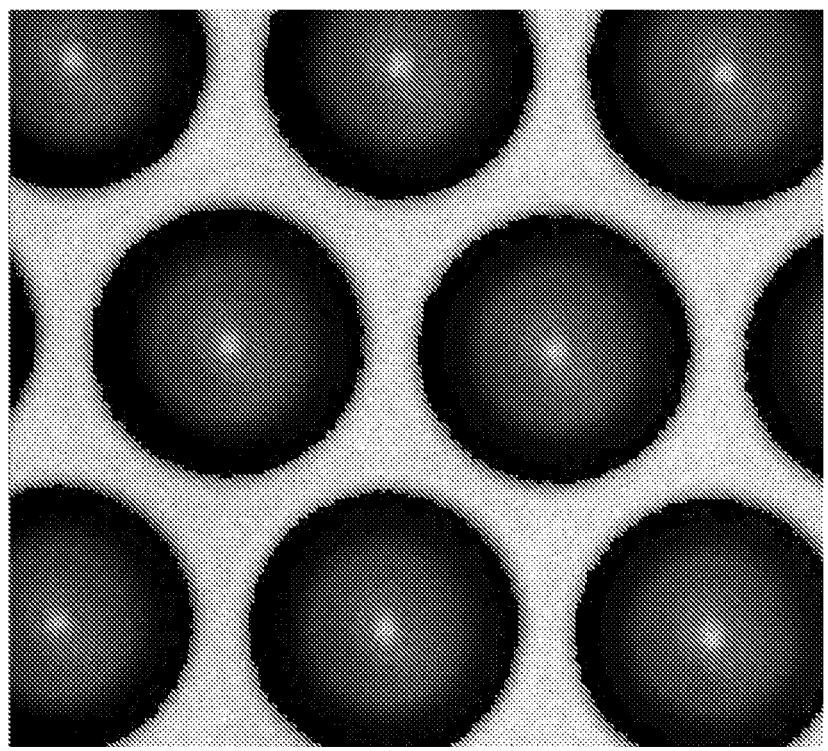
FIG. 6 is a modulation map of the PSS used to illustrate the invention showing the clear change of contrast at the boundary of the PSS features.
Figure 7A:
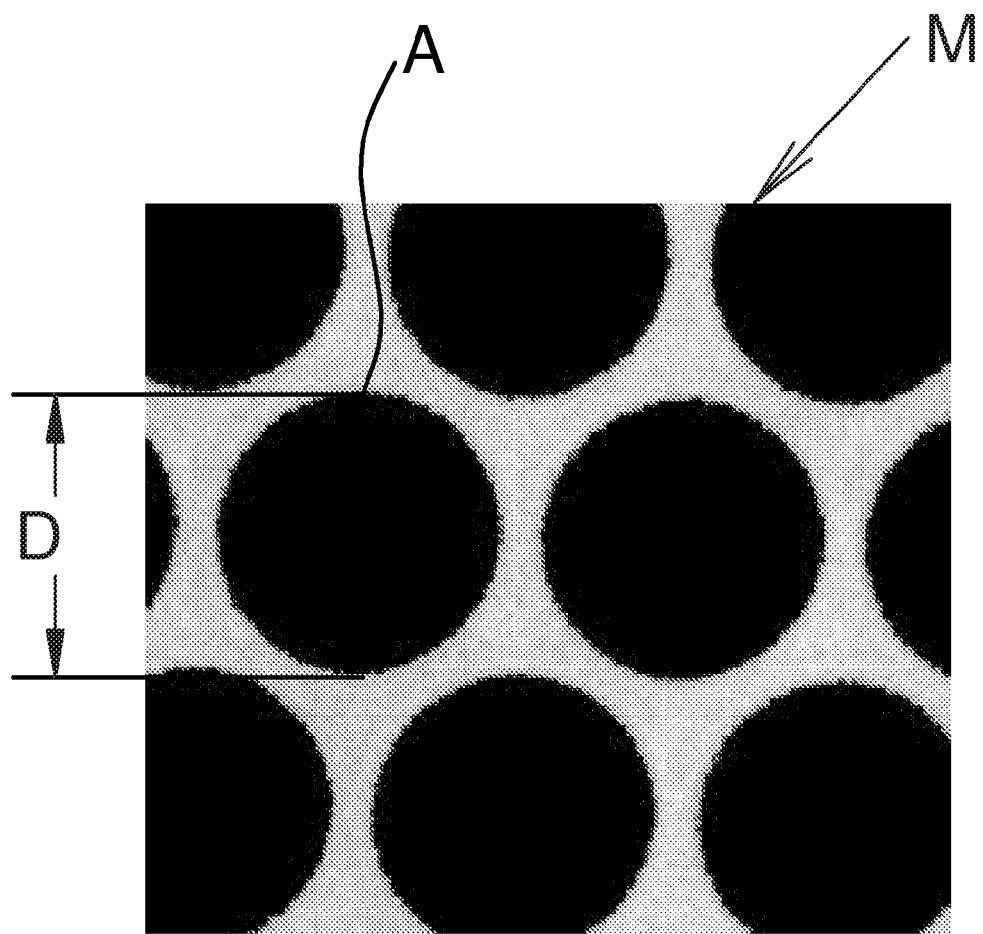
FIG. 7(a) is a map of the PSS structures where the patterned features have been identified and outlined using a modulation threshold according to the invention.
Figure 7B:
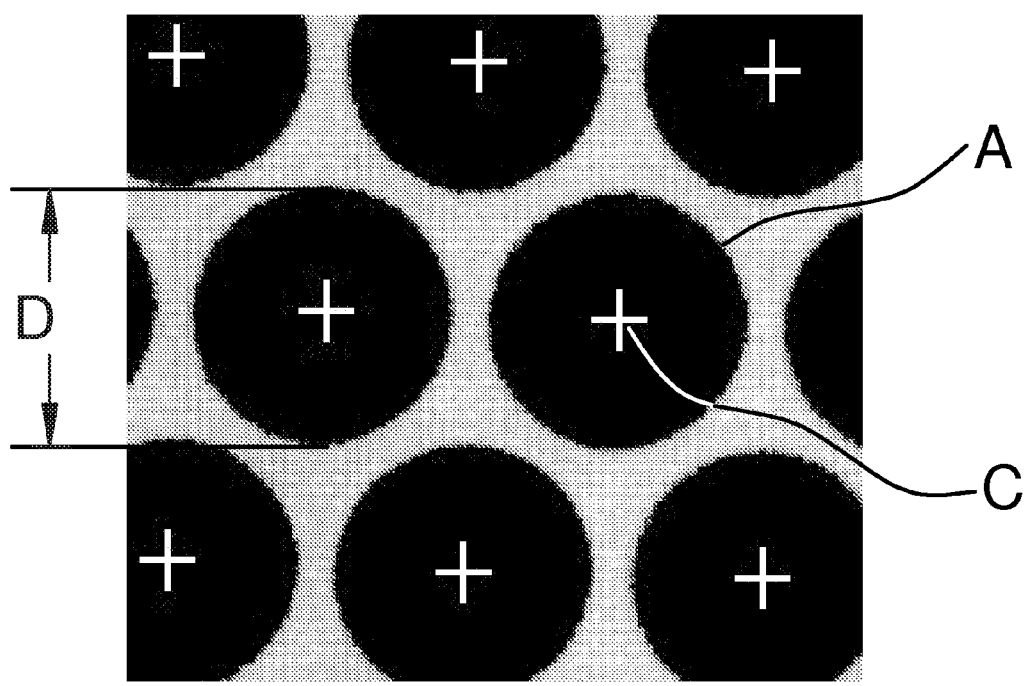
FIG. 7(b) is the map of FIG. 7(a) showing the center of the region corresponding to each PSS feature.

The overall procedure is shown in the flow-chart of FIG. 5 and detailed in the description that follows. The first step of the invention is directed at identifying and precisely locating each patterned feature on the PSS. This is accomplished from the modulation map of the surface, also illustrated more particularly in FIG. 6, by identifying the pixels with minimum modulation based on the fact that the sharp increase in height in the areas of transition between the base of the sapphire substrate and each structured feature produces great light scattering and correspondingly minimum contrast during a VSI measurement. On the other hand, contrast is maximum and relatively constant in the flat base areas of the substrate. Therefore, a simple comparison of each data point with a threshold value makes it possible to rapidly determine such minima and delineate the boundary of the area A of each feature, as illustrated in the map M of FIG. 7(a). The diameter D of the area A (i.e., the width of the feature) and the coordinates of its center C can then be calculated in straightforward manner for each feature, as illustrated in FIG. 7(b), by the application of conventional computation programs, such as Veeco Instruments Inc.'s VISION® software. Inasmuch as the purpose of this procedure is the repeated measurement of the same type of substrate for production quality-control purposes, the threshold value applied in this step can be determined most effectively empirically for a given substrate by finding the value that produces diameter results that closely match the feature width obtained by AFM measurements.

Figure 8:
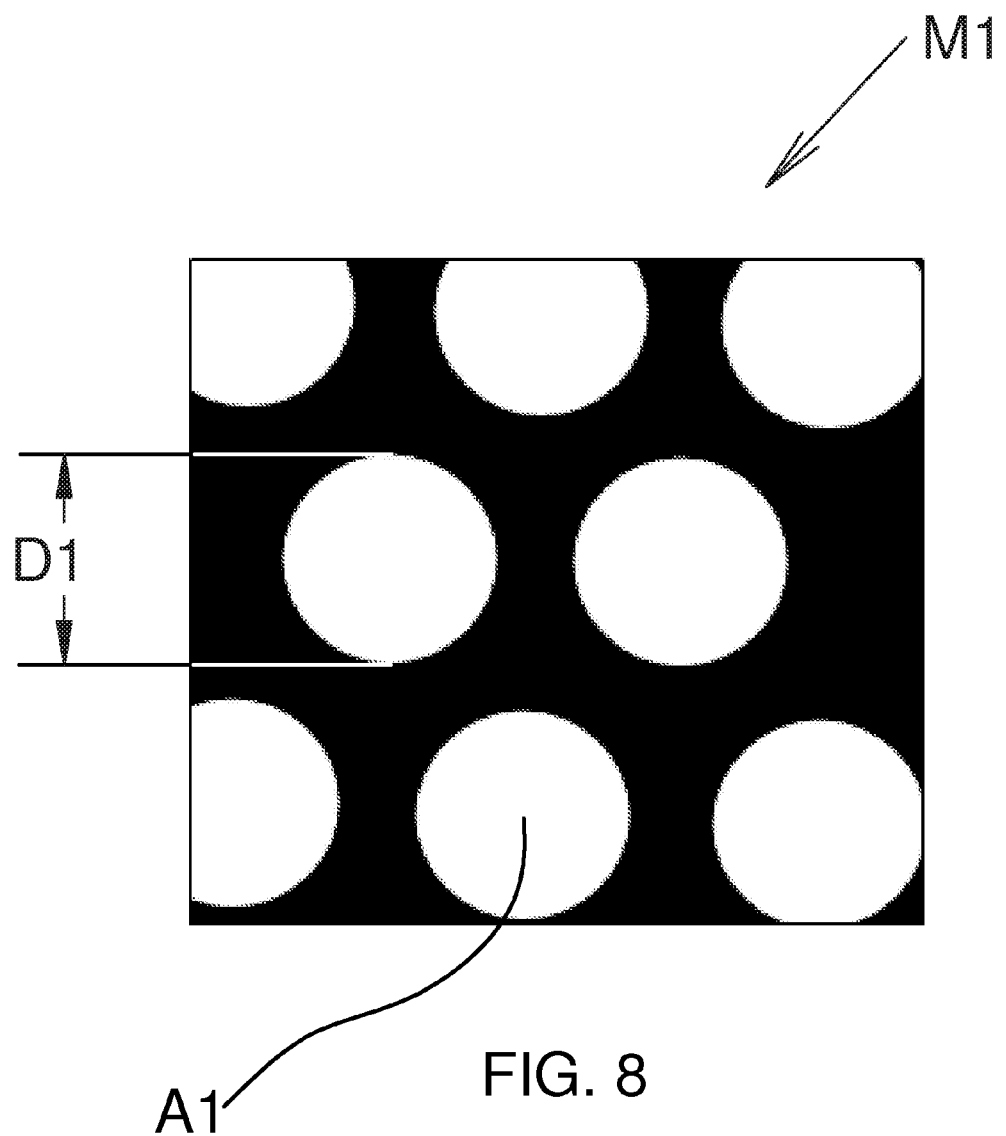
FIG. 8 is a mask defining regions within each PSS feature suitable for extracting useful phase data from the phase map available from the HDVSI or other procedure, such as shown in FIG. 9.
Figure 9:
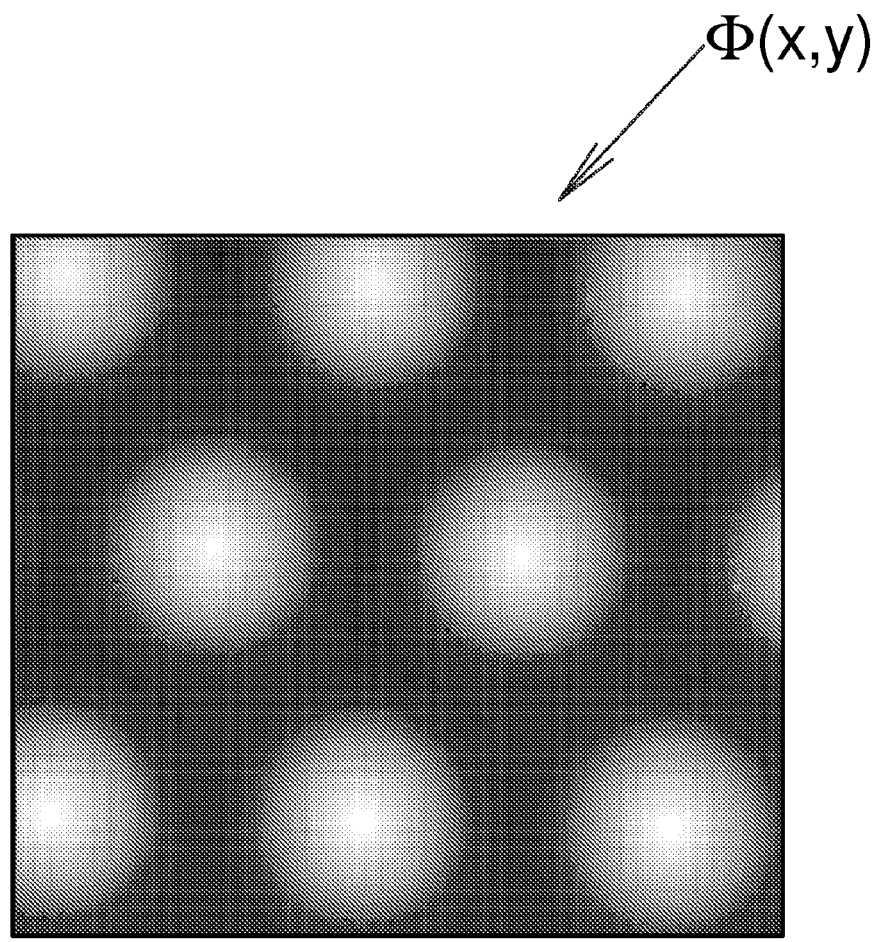
FIG. 9 is an unwrapped phase map of the PSS containing reliable height information for the regions corresponding to the tops of the PSS features.
Figure 10:
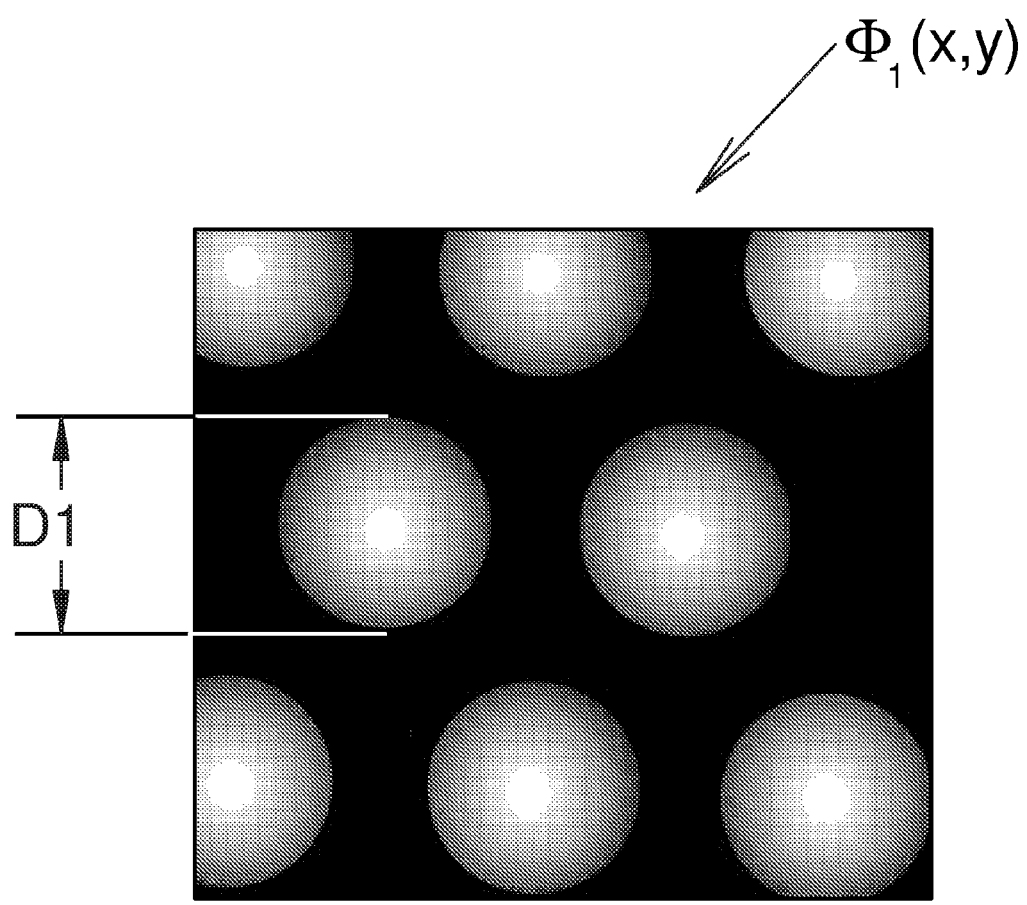
FIG. 10 is the phase map of the tops of the features obtained by applying the mask of FIG. 8 to the unwrapped phase map of FIG. 9.

Once the patterned features of the substrate are so located, the feature coordinates of FIG. 7(b) are used to produce two separate masks for the separate purposes of mapping the tops of the features and of estimating their height, according to the invention. For the first objective, an area A1 within each feature with a diameter D1 smaller than the full width D of the features is selected and a corresponding first mask M1 is created, as illustrated in FIG. 8. The size of D1 is selected to correspond to reliable unwrapped phase data in the phase map $\Phi(x, y)$ obtained during HDVSI, such as illustrated in FIG. 9. That is, D1 should not extend beyond the point where the slope of the feature would produce $2\pi$ ambiguities, which can be easily determined empirically for a given shape of the features being measured. In practice, for the measurement of typical PSS structures the phase map was found to be precise for values of D1 at least as large as about ⅔ of D, but it is understood that this would vary with the shape of the feature's dome and could always be optimized empirically for a know geometry. Once so produced, the mask M1 is combined with the unwrapped phase map $\Phi(x, y)$ produced by HDVSI (FIG. 9; see also FIG. 5) to provide a phase map $\Phi(x, y)$ of the tops of the patterned features, as shown in FIGS. 10 and 5). The phase map $\Phi_1(x, y)$ is preferably corrected for tilt in any conventional manner, if necessary, to account for possible $2\pi$ offsets between PSS features within the field of view of the interferometer. Thus, the phase map $\Phi_1(x, y)$ provides the best available surface-profile data for each pixel in the top regions of the features (defined by the mask M1). The remaining problem lies in finding the correct offset between the $\Phi_1(x, y)$ data and the base of the substrate (that is, the height of the PSS features).

Figure 11:
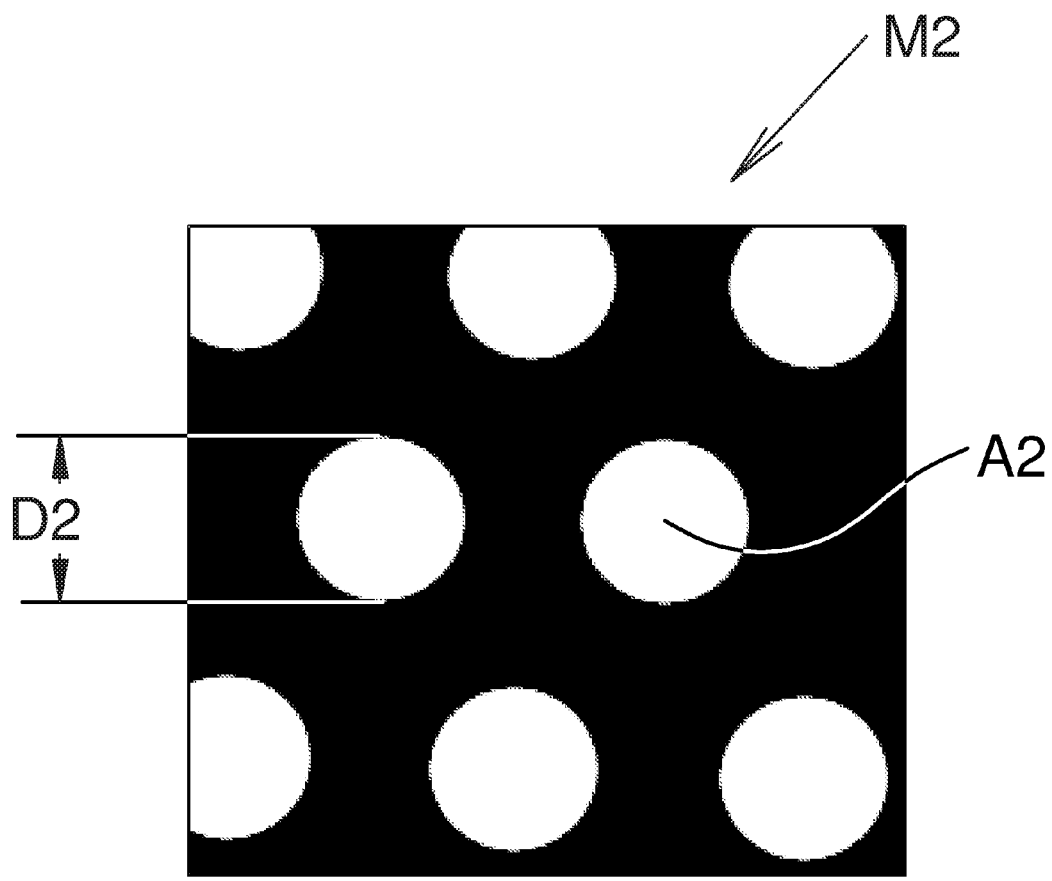
FIG. 11 is a mask defining regions within each PSS feature suitable for extracting useful height data from the height map available from the HDVSI or other procedure.

For the purpose of estimating the height of the PSS features, a second mask M2 is created, according to the invention, by selecting another diameter D2, generally smaller than D1, to define a corresponding generally smaller circular area A2 around the center of each feature, as shown in FIGS. 5 and 11. The size of D2 is selected such as to correspond to areas proximate to the maximum height of each feature, i.e., near the centers of the areas A (which are also the centers of A1 and A2). D2 should extend to a radius where the VSI (and consequently also the HDVSI) measurements of the feature show considerable presence of good data in addition to batwing effects. Again, for a given shape of the features being measured, this can be determined empirically and, if good results are obtained, D1 and D2 may be the same for convenience and economy of data processing. For typical PSS structures, values of D2 about ⅕ of D up to D1 were found to be suitable for the invention.

Figure 12:
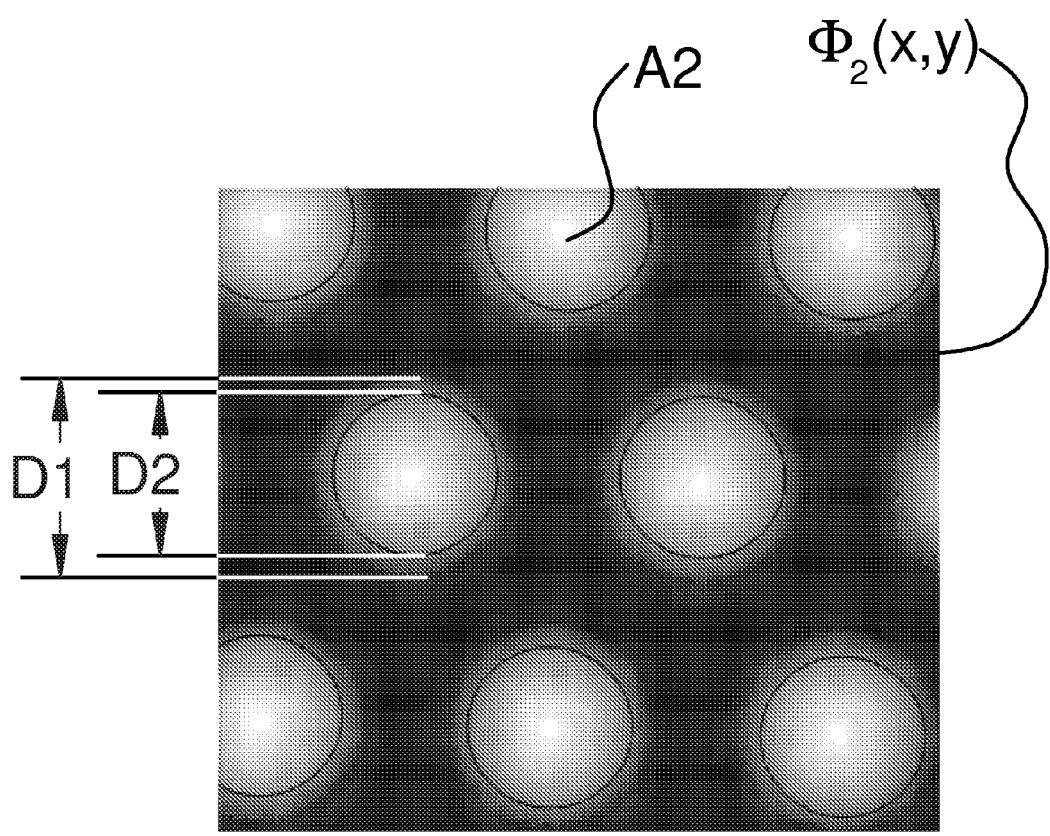
FIG. 12 is the phase map of the tops of the features obtained by applying the mask of FIG. 11 to the unwrapped and tilt-corrected phase map of FIG. 10.
Figure 13:
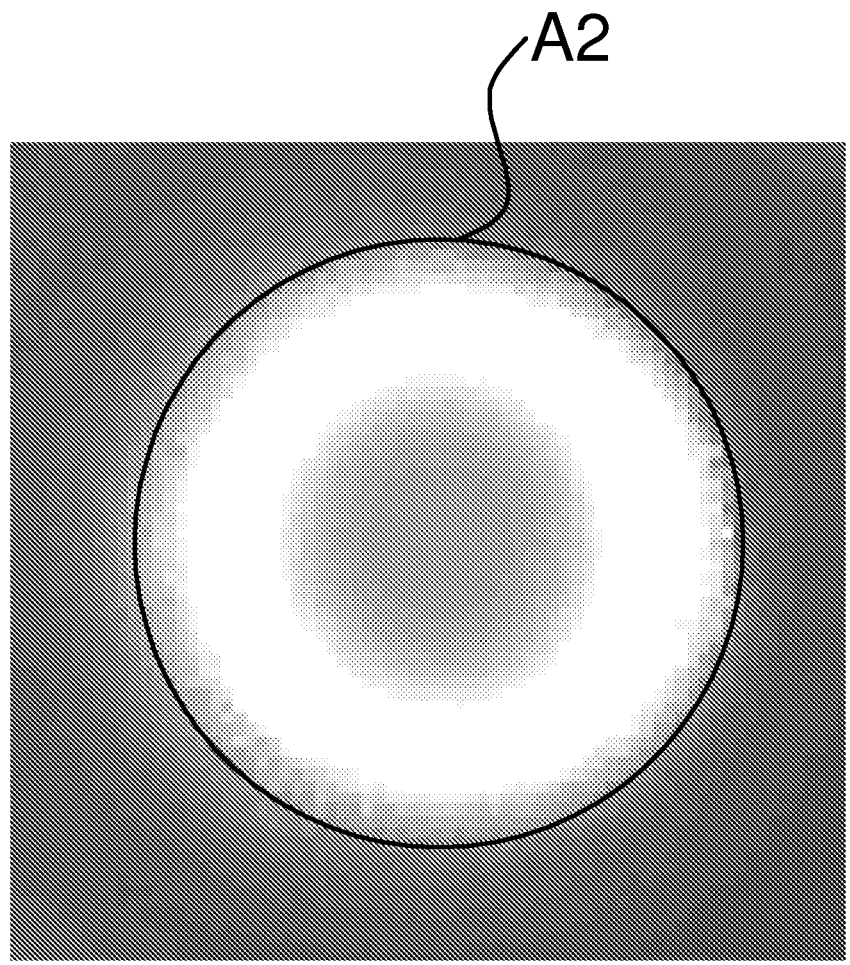
FIG. 13 is a representation of the phase data of FIG. 12 for the center region of a single bump on a PSS substrate.
Figure 14:
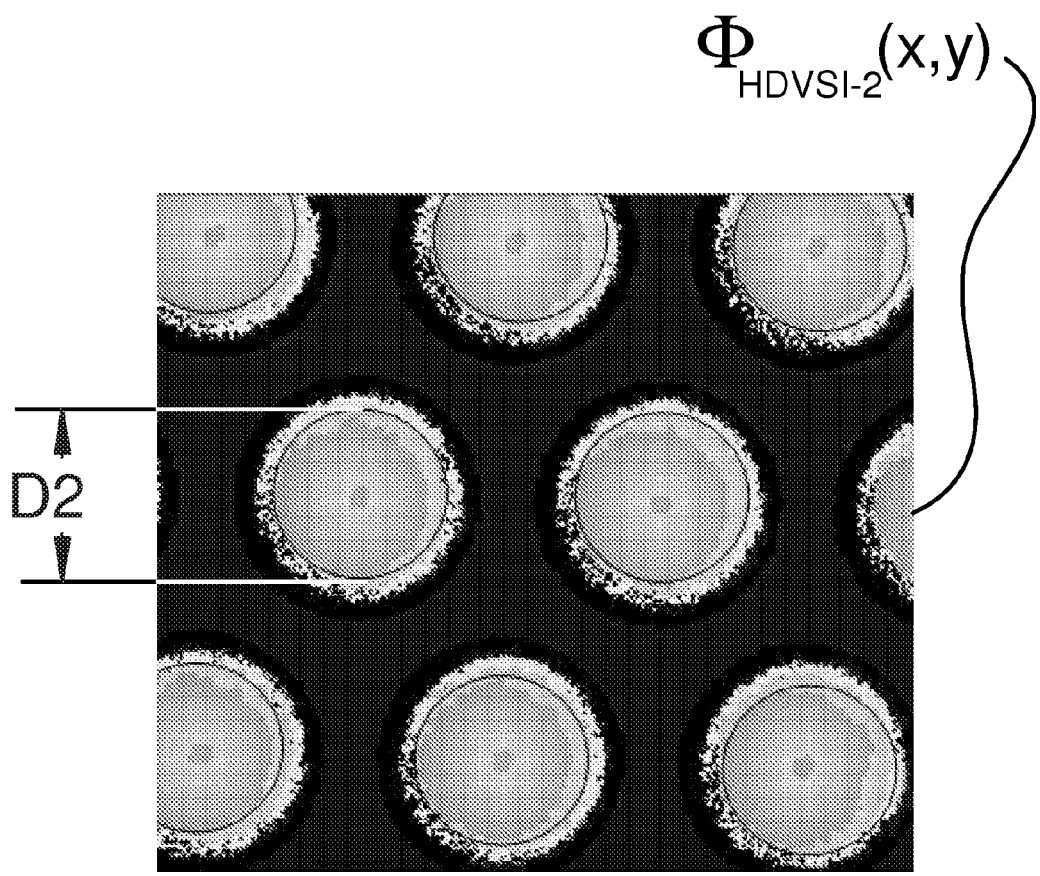
FIG. 14 is the height map of the tops of the features obtained by applying the mask of FIG. 11 to the height map available from the HDVSI or other procedure.
Figure 15:
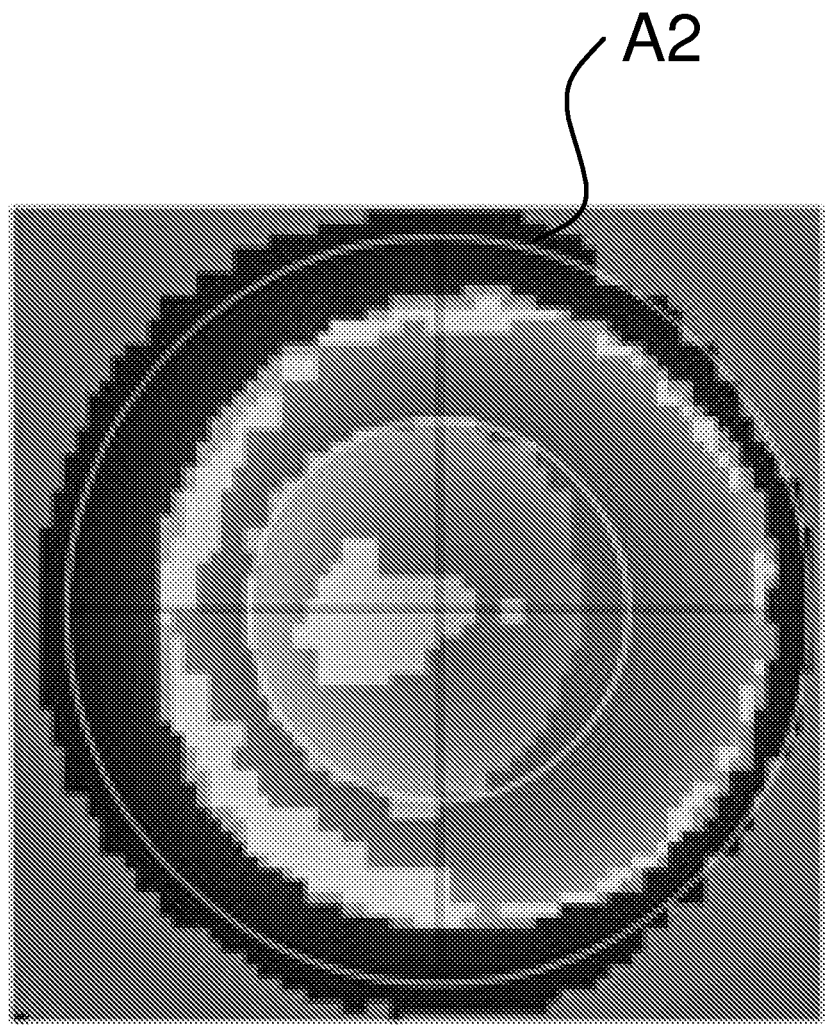
FIG. 15 is the HDVSI data for the center region of the single bump on a PSS substrate of FIG. 10.

The mask M2 is used in two manners. First, it is combined with the phase map $\Phi(x, y)$ to extract a map of phase data $\Phi_2(x, y)$ corresponding only to the top centers of the features defined by the diameters D2 of the mask M2, thereby providing phase data corresponding to these smaller regions. FIG. 12 shows the map of the phase data $\Phi_2(x, y)$. FIG. 13 shows one A2 portion of such phase data corresponding to a single bump of the PSS substrate. Second, the mask M2 is also combined with the HDVSI map $h_{HDVSI}(x, y)$ to extract an equal-size map of HVDSI data $h_{HDVSI-2}(x, y)$ (illustrated in FIG. 14) corresponding to the same top centers of the features defined by the mask M2. FIG. 15 shows the A2 portion of such HDVSI data corresponding to a single bump of the PSS substrate.

Figure 16:
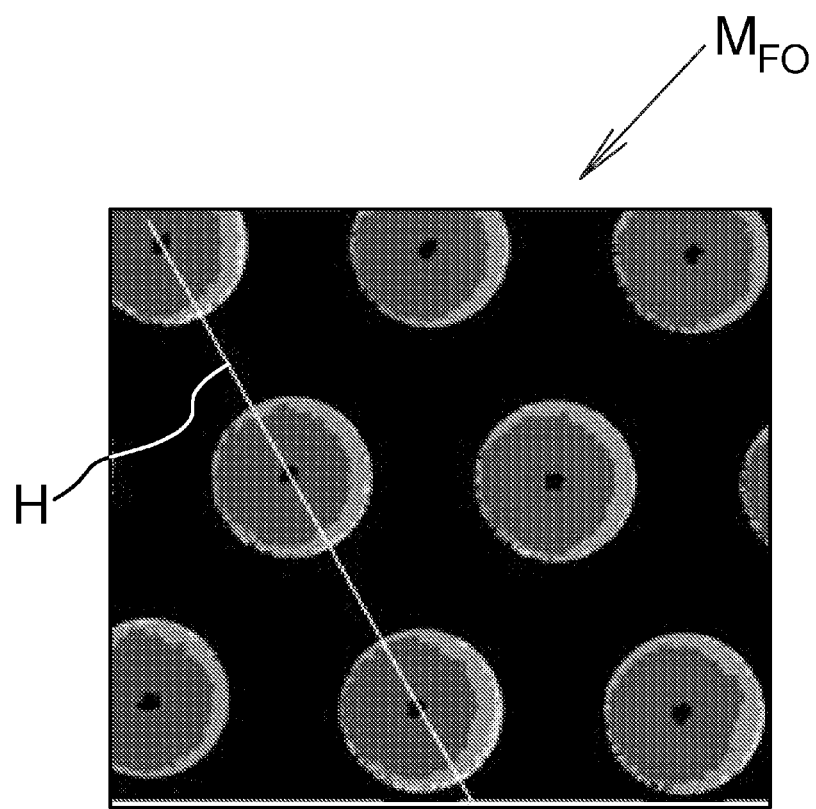
FIG. 16 illustrates a map of frequency orders obtained by subtracting phase from the corresponding masked height map of feature regions.

As one skilled in the art will readily recognize, the $h_{HDVSI-2}(x, y)$ map represents a combination of phase and fringe order for each pixel in the map. Therefore, by subtracting phase from the Masked HDVSI map [that is, $h_{HDVSI-2}(x, y)-\Phi_2(x, y)$] a pixel-by-pixel fringe-order map $M_{FO}$ is obtained for the feature regions defined by the mask M2 (see FIGS. 5 and 16). Such fringe-order map $M_{FO}$ is then used, according to the invention, to correct the batwing errors in the original $h_{HDVSI}(x, y)$ map.

The fringe-order map $M_{FO}$ is analyzed to produce a histogram of the number of pixels for each fringe order in the map. Assuming that the majority of pixels in the regions defined by M2 represent good data, the fringe order with the greatest histogram frequency in each A2 region is assumed to be correct and it is adopted as the correct offset between the corresponding pixels and base of the substrate. Note that for simplicity this step may also be carried out using more than one A2 region at a time, such as using the A2 areas corresponding to all features within the field of view. For convenience when the uniformity and symmetry of the features allow it, a sample of such data may be taken from a section across a row of features in the field of view, as illustrated by the line H in FIG. 16. Once so selected, the height corresponding to the fringe order determined by the maximum histogram value is set as the offset for each top region A1 of the phase map $\Phi_1(x, y)$ from the base of the substrate.

Figure 17:
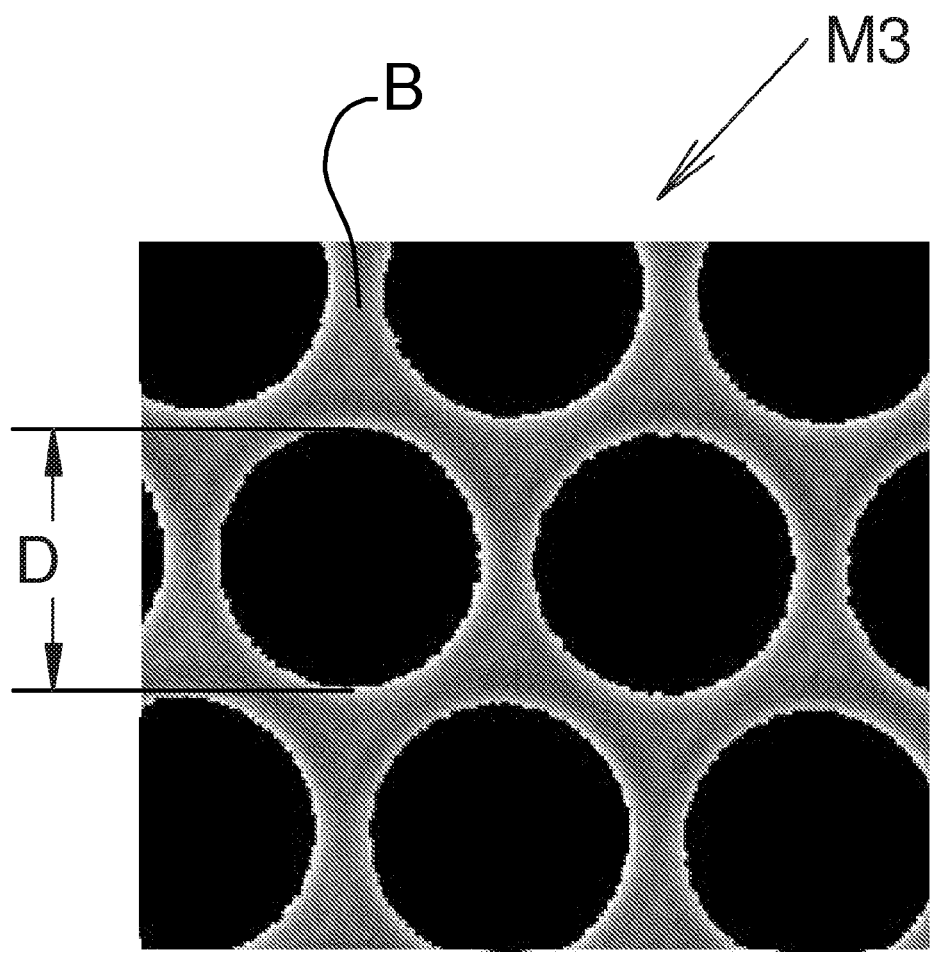
FIG. 17 is the height map of the substrate base obtained by removing the regions of PSS features defined in the map of FIG. 7(a) from the height map available from the HDVSI or other procedure.
Figure 18:
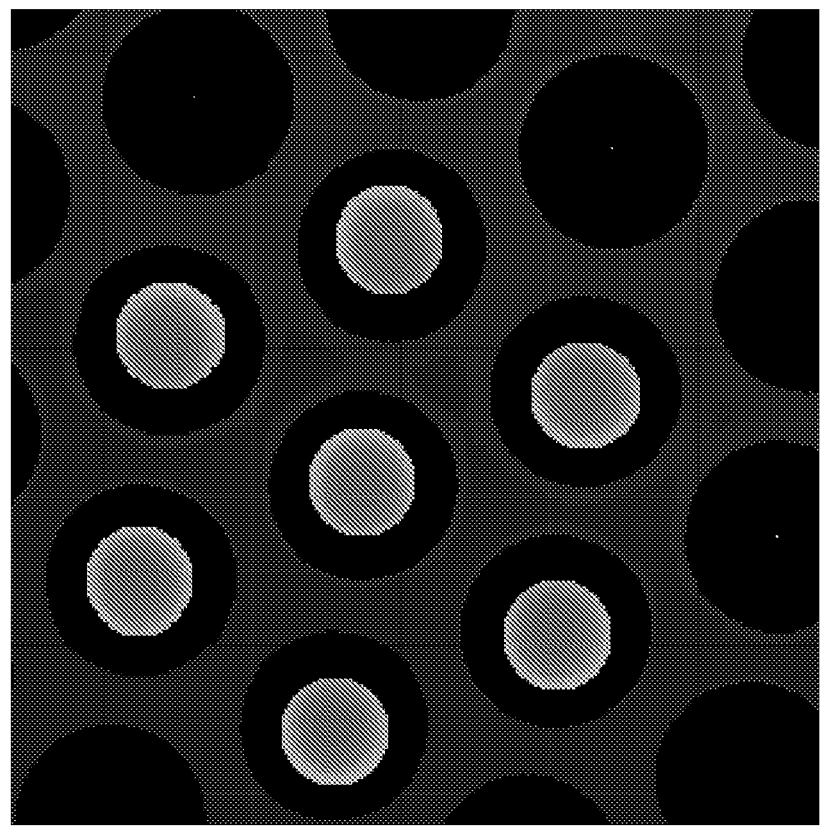
FIG. 18 is a map representation of the PSS substrate showing the width of the patterned features calculated according to the invention.
Figure 19:
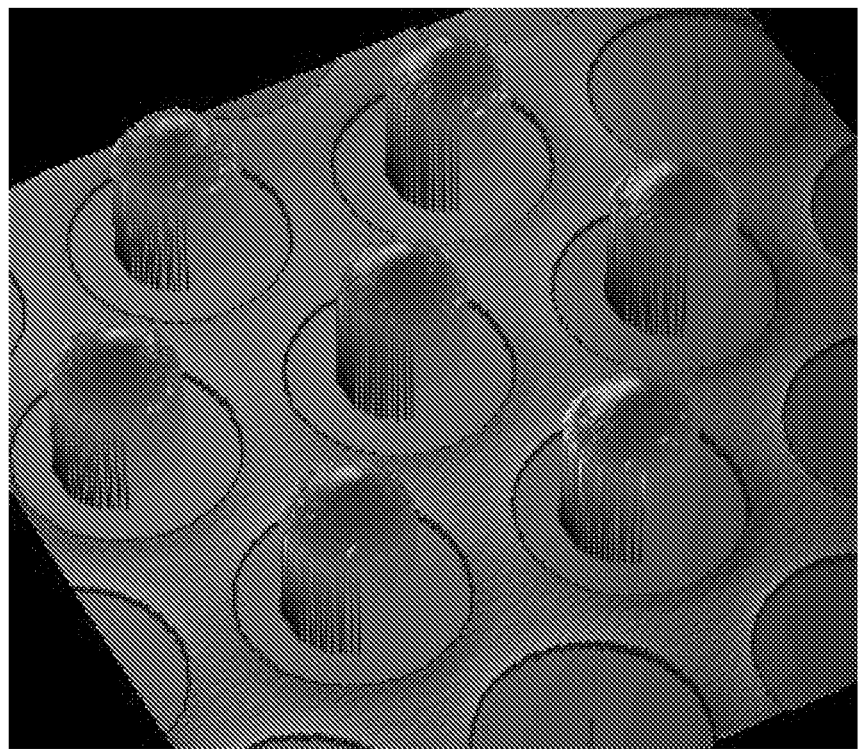
FIG. 19 is a perspective view of the map of FIG. 17 showing the width and the height of the patterned features calculated according to the invention.

A good height map M3 of the substrate base, illustrated in FIG. 17, may be obtained simply by removing the bump regions A of the map M from the HDVSI height map $h_{HDVSI}(x, y)$ (see FIG. 5). By masking out the patterned features corresponding to the A regions, the map M3 is left with the areas B of the HDVSI height map corresponding only to the flat sapphire substrate regions. This map is then combined with the map of phase data $\Phi_1(x, y)$ where the offset for each pixel is determined by the fringe order resulting from the statistical analysis of the invention. The result is a map $M_{PSS}$ of the PSS structure showing the width and the height of the bumps. FIGS. 18 and 19 illustrate such result in plan and perspective views, respectively. Because the exact profile of the transition areas between the base and the walls of the bumps (from D to D1) are not important to the end of the measurement (which is intended to measure principally bump width and height), any conventional interpolation procedure is acceptable to fill in the missing data to produce an overall map of the structure, if desired for visual completeness.

Figure 20:
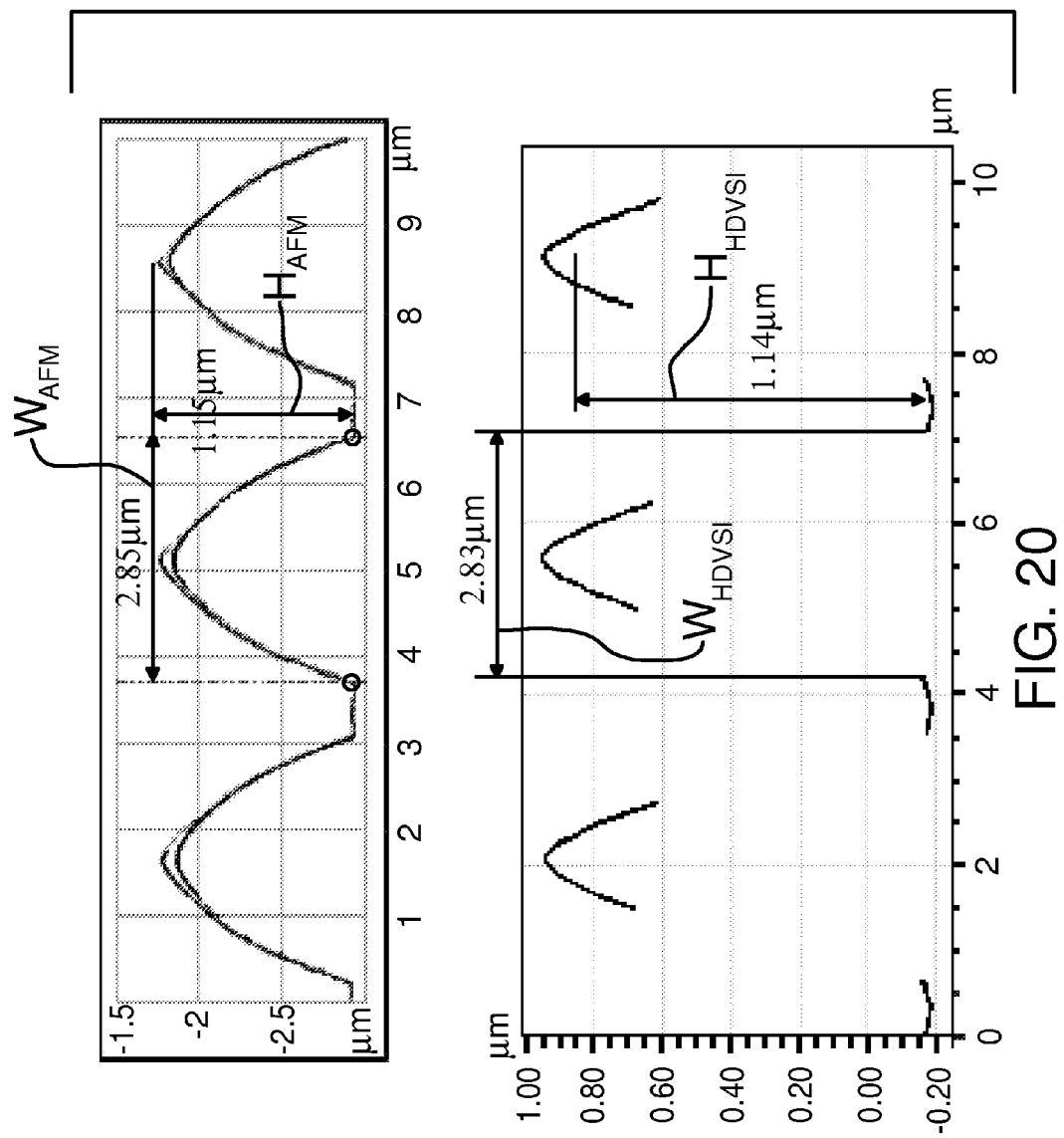
FIG. 20 shows the profile of typical PSS bumps produced by AFM measurements and by measurements according to the invention for confirmation of height and width accuracy.
Figure 21A:
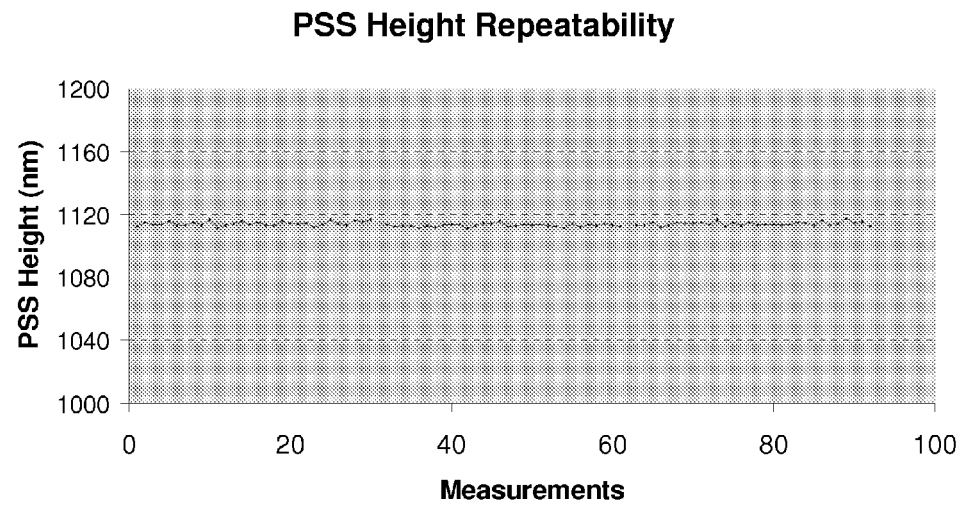
FIG. 21(a) is a plot of feature height versus measurement data to illustrate the repeatability of the height measurements produced by the procedure of the invention.
Figure 21B:
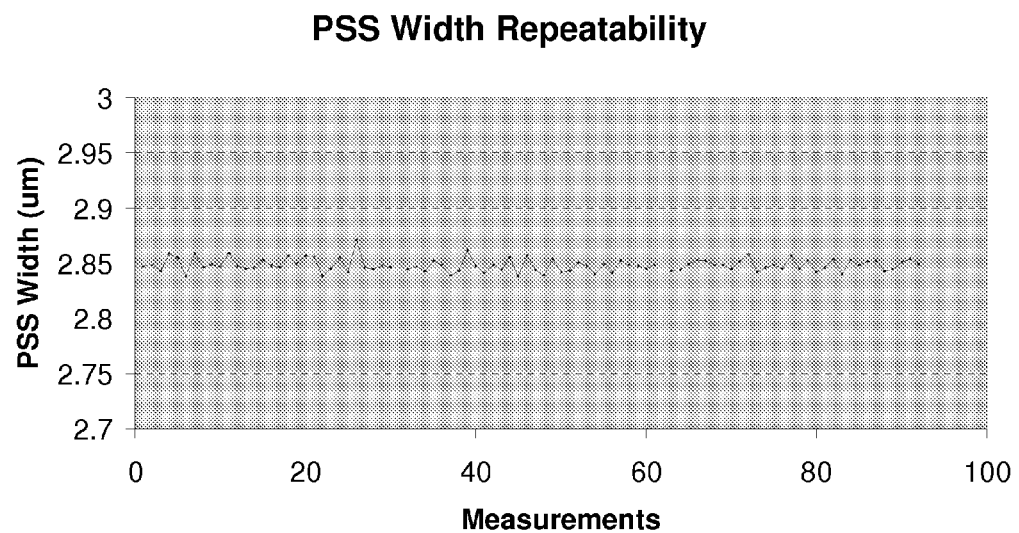
FIG. 21(b) is a plot of feature width versus measurement data to illustrate the repeatability of the width measurements produced by the procedure of the invention.

Thus, an improved procedure has been disclosed for measuring rapidly the width and height of uniformly shaped structures extending up (or down) from a substantially flat substrate surface. A comparison with ATF measurements of PSS structures has shown that such HDVSI measurements are very precise and repeatable. FIG. 20 illustrates the close match of the width and height results produced by AFM measurements ($W_{AFM}$ and $H_{AFM}$, respectively) and by HDVSI ($W_{HDVSI}$ and $H_{HDVSI}$, respectively). FIGS. 21(a) and (b) illustrate the high degree of repeatability of the results obtained with the procedure of the invention. Ninety measurements produced height results of 1.114 nm average with a 3σ-deviation (the standard requirement in the industry) of 4.0 nm, shown in FIG. 21(a), and width results of 2.848 nm average with a 3σ-deviation of 17.6 nm, in FIG. 21(b).

Figure 22:
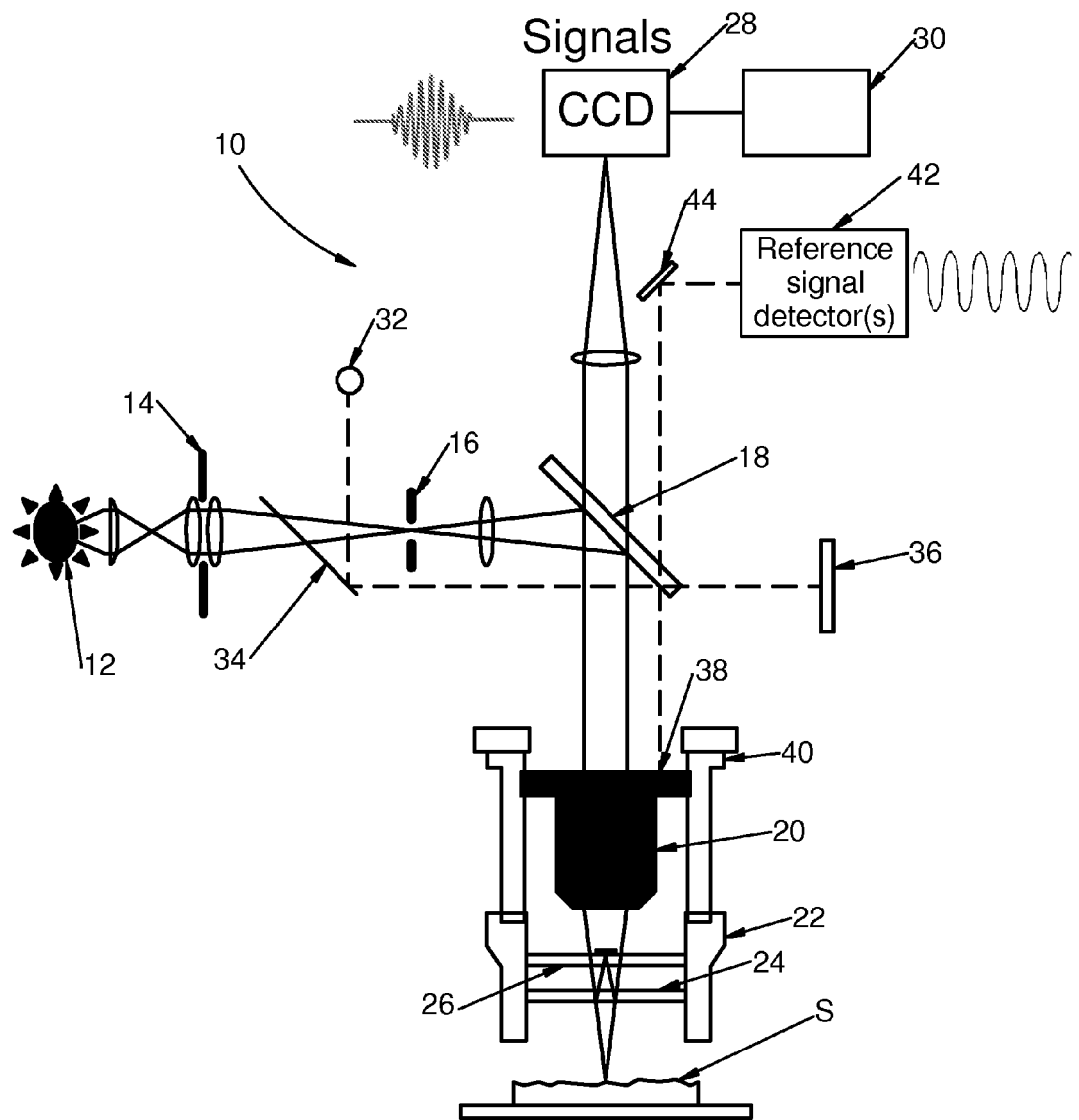
FIG. 22 is a schematic representation of an interferometric profiler suitable for practicing the invention.

The invention may be implemented with conventional interferometric equipment modified to perform the improved HDVSI procedure described above. As illustrated schematically in FIG. 22, typical equipment comprises an interferometer 10 with a broadband light source 12 directing a beam of light through an aperture 14 and field stop 16 toward a beam splitter 18 that reflects the light in the direction of the test surface S (the PSS substrate). The light reflected by the beam splitter 18 passes through a microscope objective 20 focused on the test surface S. The objective incorporates an interferometer 22, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 20 and through the beam splitter 18 to a solid-state detector array 28 in a camera in coaxial alignment with the objective 20. Appropriate electronic hardware is provided to receive the digitized intensity data generated by the detector into a microprocessor 30 that is programmed for processing according to the novel steps of the present invention. The microscope objective 20, as well as the interferometer typically incorporated within it, is adapted for vertical movement to focus the image of the test surface on the detector array 28.

A reference-signal module is preferably built into the interferometer 10 and dedicated to monitor OPD changes through a separate reference-signal channel. A laser 32 may be used to provide a good-quality reference signal and a beamsplitter 34 is added in the optical measurement path to direct the laser beam toward the main splitter 18. A portion of the light is passed through to a reference mirror 36 dedicated to the reference signal, while the balance of the light is reflected toward a mirror or other reflective element 38 (such as a corner cube or a reflecting grating) placed on the moving part of the scanner 40 of the measurement interferometer. After reflection, both beams are recombined at the splitter 18 and directed to a reference signal detector 42 by a mirror 44.

Figure 23:
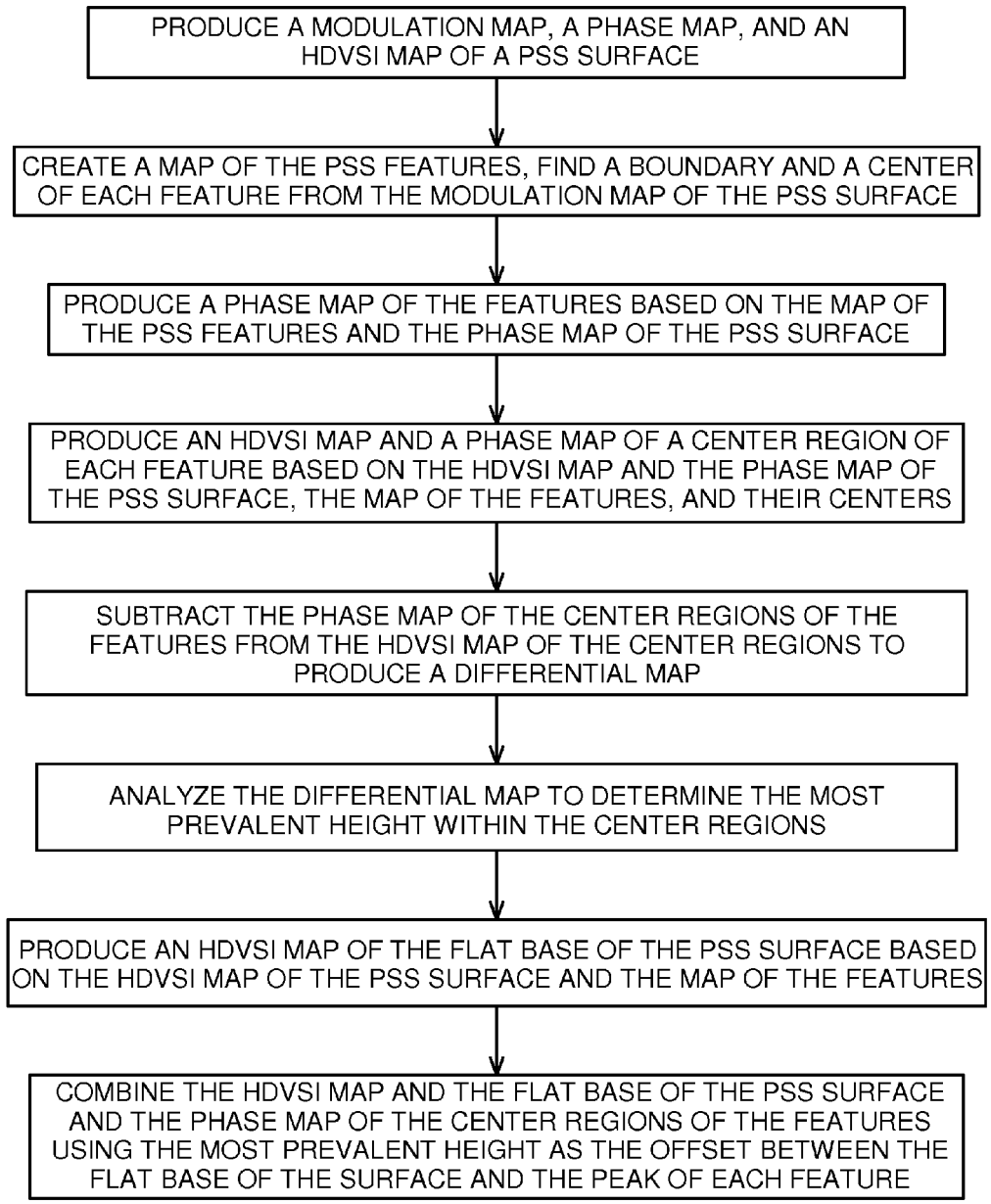
FIG. 23 is a descriptive flow-chart of the basic steps involved in the procedure of the invention.

FIG. 23 describes the basic steps of the invention. It is understood, however, that while the invention has been shown and described herein in what are believed to be the most practical and preferred embodiments, departures can be made therefrom within the scope of this description and the claimed subject matter. For example, while the invention has been disclosed with reference to PSS features extending upward from the flat base surface, any substrate with 3-D features extending either upward or downward from a substantially smooth surface can be measured accurately with the technique of the invention. The same interferometric measurement problems apply to both situations and the depth (instead of the height) of the well (instead of the bump) would be measured.

Also, the invention has been described based on phase and height data obtained using the HDVSI procedure referenced herein, but it could be implemented with improved results using phase data obtained by any conventional means. Similarly, for particularly suitable feature structures, D1 can be selected equal to D2 for simplicity of calculation. Finally, the figures exhibit a calculation of the height offset based on a global evaluation (taking all bump areas together), but, as described above, it could be performed as well on a bump-by-bump basis within the scope of the invention and in some instances such option could be preferable depending on the shape of the features.

Therefore, the invention is not to be limited to the details disclosed herein but is to be accorded the full scope of the claims so as to embrace any and all equivalent processes and products.

The invention claimed is:

1. A method for measuring the height of a three-dimensional surface feature extending from a base in a substrate, comprising the following steps:
   producing a height map of the feature with respect to the base and a phase map of the feature;
   producing a fringe-order map of the feature with respect to the base;
   analyzing the fringe-order map to determine a most prevalent fringe order of the feature; and
   producing a corrected height map of the feature by assigning said most prevalent fringe order to corresponding pixels in the phase map of the feature.

2. The method of claim 1, wherein said analyzing step is carried out using a statistical approach.

3. The method of claim 2, wherein said statistical approach is a histogram.

4. The method of claim 1, wherein said height map is derived from a modulation map.

5. The method of claim 1, wherein said height map is derived from a combination of a modulation map and said phase map.

6. The method of claim 5, wherein said fringe-order map is derived from said combination of the modulation map and the phase map.

7. The method of claim 1, wherein said fringe-order map is derived from said height map.

8. The method of claim 1, wherein said feature is a protrusion extending upward from said base in the substrate.

9. The method of claim 1, wherein said feature is a dimple extending downward from said base in the substrate.

10. A method for profiling a substrate containing a three-dimensional surface feature extending from a base in the substrate, comprising the following steps:
    producing a height map of the substrate and a phase map of the feature;
    producing a fringe-order map of the feature with respect to the base;
    analyzing the fringe-order map to determine a most prevalent fringe order of the feature; and
    producing a corrected height map of the substrate by combining the height map of the substrate and the phase map of the feature and assigning said most prevalent fringe order to corresponding pixels in the phase map of the feature.

11. The method of claim 10, wherein said analyzing step is carried out using a statistical approach.

12. The method of claim 11, wherein said statistical approach is a histogram.

13. The method of claim 10, wherein said height map is derived from a modulation map.

14. The method of claim 10, wherein said height map is derived from a combination of a modulation map and said phase map.

15. The method of claim 14, wherein said fringe-order map is derived from said combination of the modulation map and the phase map.

16. The method of claim 10, wherein said fringe-order map is derived from said height map.

17. The method of claim 10, wherein said feature is a protrusion extending upward from said base in the substrate.

18. The method of claim 10, wherein said feature is a dimple extending downward from said base in the substrate.

19. A method for profiling a substrate containing a three-dimensional surface feature extending from a base in the substrate, comprising the following steps:
    producing a height map of the substrate and a phase map of the substrate;
    extracting a phase map of the feature from said phase map of the substrate;
    producing a fringe-order map of the feature with respect to the base of the substrate;
    analyzing the fringe-order map to determine a most prevalent fringe order of the feature;
    extracting a phase map of said base of the substrate from the phase map of the substrate; and
    producing a corrected height map of the substrate by combining the phase map of the base of the substrate and the phase map of the feature and assigning said most prevalent fringe order to corresponding pixels in the phase map of the feature.

20. The method of claim 19, wherein said analyzing step is carried out using a statistical approach.

21. The method of claim 20, wherein said statistical approach is a histogram.

22. The method of claim 19, wherein said height map is derived from a modulation map.

23. The method of claim 22, wherein said step of extracting a phase map of the feature from the phase map of the substrate is carried out by finding locations of minimum contrast in said modulation map and setting a predetermined threshold to define a boundary of the feature.

24. The method of claim 23, further including the step of determining a width of the feature from said boundary thereof.

25. The method of claim 19, wherein said step of extracting a phase map of said base of the substrate from the phase map of the substrate is carried out by subtracting said phase map of the feature from the phase map of the substrate.

26. The method of claim 19, wherein said height map is derived from a combination of a modulation map and said phase map.

27. The method of claim 26, wherein said fringe-order map is derived from said combination of the modulation map and the phase map.

28. The method of claim 19, wherein said fringe-order map is derived from said height map.

29. The method of claim 19, wherein said feature is a protrusion extending upward from said base in the substrate.

30. The method of claim 19, wherein said feature is a dimple extending downward from said base in the substrate.

31. A method for measuring the height of a three-dimensional surface feature extending from a base in a substrate, the method comprising the following steps:
    producing a modulation map, a phase map, and a height map of the substrate, said height map being obtained by combining the phase map with height information derived from the modulation map;
    creating a location map of said feature by finding a boundary and a center thereof from the modulation map of the substrate;
    producing a phase map of a center region of the feature based on the phase map of the substrate, the map of the feature, and the center thereof;
    producing a height map of a center region of the feature based on the height map of the substrate, the map of the feature, and the center thereof;

subtracting the phase map of the center region of the feature from the height map of the center region of the feature to produce a fringe-order map of the center region;

analyzing said fringe-order map to determine a most prevalent fringe order in said fringe-order map of the center region;

producing a height map of the base of the substrate based on the height map of the substrate and said map of the feature; and combining the height map of the base of the substrate and the phase map of the feature using said most prevalent fringe order as an offset between the base of the substrate and a pixel corresponding to said fringe order in the fringe-order map.

32. The method of claim 31, wherein said map of the feature is created by finding locations of minimum contrast in said modulation map and setting a predetermined threshold to define said boundary of the feature.

33. The method of claim 31, wherein said phase map of a center region of the feature is created over a region smaller than defined by said boundary of the feature.

34. The method of claim 31, wherein said height map of a center region of the feature is created over a center region smaller than defined by said boundary of the feature.

35. The method of claim 31, wherein said analyzing step is carried out with a histogram.

36. The method of claim 31, further including the step of determining a width of the feature from said boundary thereof.

37. The method of claim 31, wherein said height map is produced using a high-definition vertical-scan interferometry procedure.

38. The method of claim 31, wherein said three-dimensional surface feature is a protrusion of a patterned sapphire substrate.

39. Interferometric apparatus for measuring the height of a three-dimensional surface feature extending from a base in a substrate, the apparatus comprising:

means for producing a height map of the feature with respect to the base of the substrate and a phase map of the feature;

means for producing a fringe-order map of the feature with respect to said base;

means for analyzing the fringe-order map to determine a most prevalent fringe order of the feature; and means for producing a corrected height map of the feature by assigning said most prevalent fringe order to corresponding pixels in the phase map of the feature.

40. The apparatus of claim 39, wherein said means for analyzing includes a histogram.

41. The apparatus of claim 39, wherein said means for producing a height map and a phase map of the feature includes means for finding locations of minimum contrast in a modulation map of the substrate and for setting a predetermined threshold to define a boundary of the feature.

42. The apparatus of claim 41, further including means for determining a width of the feature from said boundary thereof.

43. A computer program product for use in a computerized system for measuring the height of a three-dimensional surface feature extending from a base in a substrate, the computer program product comprising a non-transitory computer readable medium having computer-readable program code disposed therein that includes a series of computer-readable program steps to effect:

producing a height map of the feature with respect to the base and a phase map of the feature;

producing a fringe-order map of the feature with respect to the base;

analyzing the fringe-order map to determine a most prevalent fringe order of the feature; and producing a corrected height map of the feature by assigning said most prevalent fringe order to corresponding pixels in the phase map of the feature.

* * * * *